March 11, 1969     J. J. ROSEN     3,432,581
MAKING FOAMED ARTICLES AND ARTICLES PRODUCED THEREBY
Filed Oct. 31, 1967     Sheet 1 of 4

Jacob J. Rosen
INVENTOR

BY Jacobi & Davidson
ATTORNEYS

Jacob J. Rosen
INVENTOR

March 11, 1969          J. J. ROSEN          3,432,581
MAKING FOAMED ARTICLES AND ARTICLES PRODUCED THEREBY
Filed Oct. 31, 1967
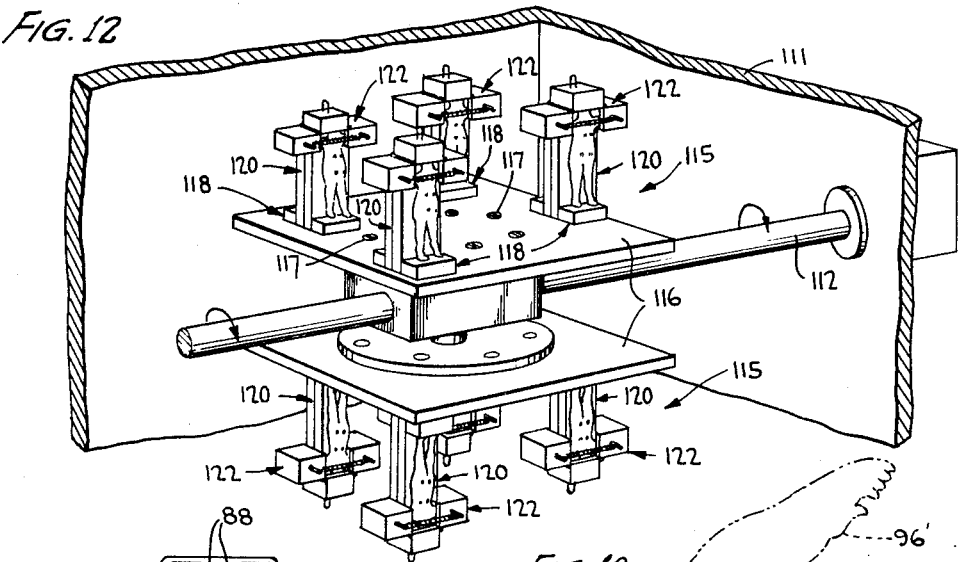
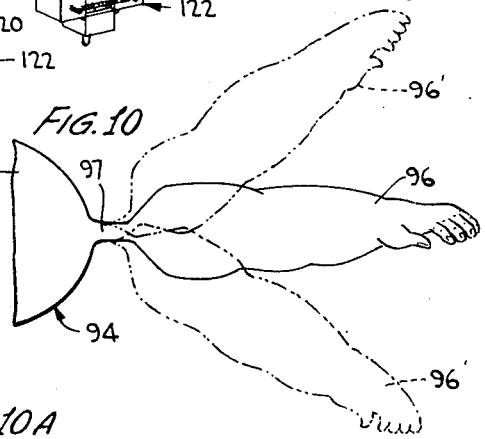
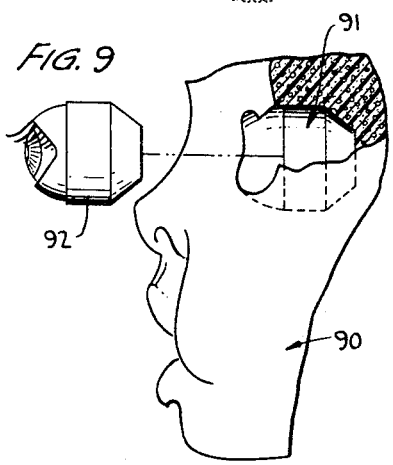
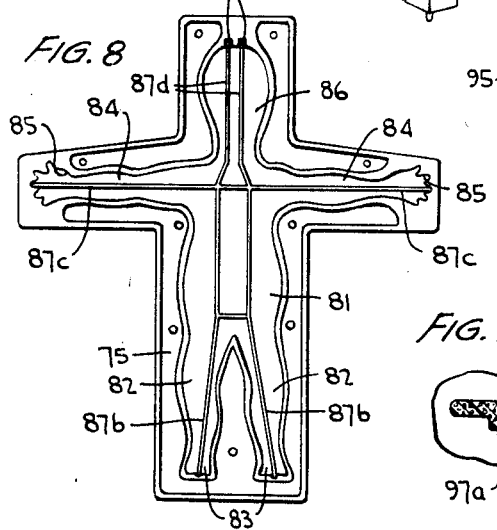
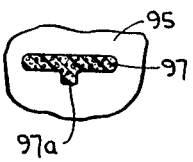
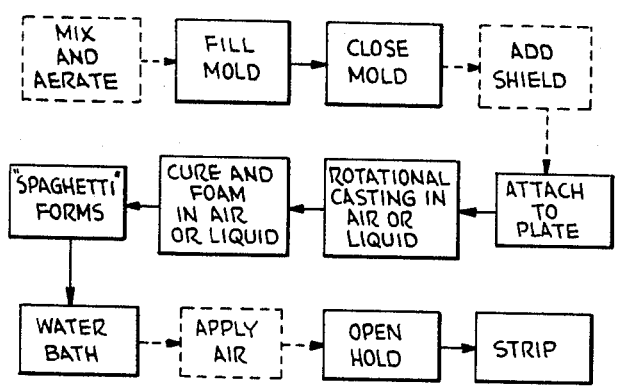
INVENTOR,
JACOB J. ROSEN
BY
ATTORNEYS March 11, 1969   J. J. ROSEN   3,432,581
MAKING FOAMED ARTICLES AND ARTICLES PRODUCED THEREBY
Filed Oct. 31, 1967   Sheet 4 of 4

INVENTOR,
JACOB J. ROSEN
BY
ATTORNEYS

United States Patent Office 3,432,581
Patented Mar. 11, 1969

1

3,432,581
MAKING FOAMED ARTICLES AND ARTICLES PRODUCED THEREBY
Jacob J. Rosen, New York, N.Y., assignor to Dublon, Incorporated, Newark, N.J., a corporation of New Jersey
Continuation-in-part of application Ser. No. 611,392, Jan. 24, 1967. This application Oct. 31, 1967, Ser. No. 679,476
U.S. Cl. 264—45                              30 Claims
Int. Cl. B29h 7/20; B29d 27/00; B29c 5/04

ABSTRACT OF THE DISCLOSURE

Methods for producing foamed articles from an unfoamed, but foamable, plastic composition, specifically foamable polyvinyl chloride plastisol, wherein the final product is formed of a continuous foam structure including a cellular inner portion and a substantially enveloping, generally smooth, outer skin integral therewith. Preferred techniques include mixing and aerating a plastic composition, distributing a gelled layer of the plastic composition on the mold surface by rotational casting and subsequently curing and foaming the same while venting portions of the mold to a surrounding environment having a pressure less than that existing in the mold cavity at least during the latter portion of the foaming phase to preclude damage to the surface of the article and to form the generally smooth, integral outer skin.

BACKGROUND OF THE INVENTION

This application is a continuation-in-part of my earlier application Ser. No. 611,392, filed Jan. 24, 1967 and now abandoned, which in turn is a continuation-in-part of application Ser. No. 422,124 filed Dec. 30, 1964 and now abandoned.

This invention relates generally to articles formed from a foamable plastic composition, and is also particularly concerned with techniques used in making such articles.

Specifically, the invention is concerned with the provision of an article (a) which can be of virtually any shape or form; (b) which has an external surface with a smoothness, appearance and definition of detail closely simulating that which can be achieved with hollow articles "molded" of polyvinyl chloride (PVC) plastisols or other such plastic materials of a non-foamable nature; (c) which is lightweight in nature, soft and compressible, and yet which, at least for the most part, has an integral and at least substantially continuous structure in any cross-section extending between exposed surfaces thereof; (d) which, notwithstanding its conformance with the characteristics of clauses (a)–(c) of this paragraph, is still a foam body capable of being made by introducing a given quantity of non-foamed, but foamable, material, and preferably foamable polyvinyl chloride plastisol, into a mold and then merely processing the mold in a prescribed manner to form the body, with the material itself initially filling only a part of the mold; (e) which is capable of being formed to receive, and capable of then receiving and retaining, components made from other materials, with the strength of the body of the present invention being sufficient to cooperate with such other components in a functionally and commercially usable

2 manner; (f) which is capable of having an internal frame or wire structure embedded therein during the formation thereof so as to permit controlled manipulation of the body to self-retaining configurations thereof; (g) which can be made with desired color characteristics which are retained in ultimate use of the body; (h) which lends itself in manufacture, consistent with the invention, to the use of available operating and processing machinery with, at most minimum modification thereto; and (i) which lends itself with equal ease to use in inexpensive type items as well as expensive type items, such as, for example, the relatively less expensive and relatively more expensive type dolls.

The factors listed in the preceding paragraphs are mentioned initially because, as explained more fully below, many of such factors are seemingly inconsistent with one another. For example, in the doll industry, the concept of a soft foam body is generally inconsistent with the concept of a body having an external surface which possesses a smoothness, continuity, and quality of substantially the same character as a hollow body formed of a so-called "molded" polyvinyl chloride plastisol or the like. Similarly, the concept of having a foam body with at least a substantially continuous structure in any cross-section between exposed surface portions thereof is generally inconsistent with the concept of having a body which can be formed to receive, and which has sufficient strength to retain, auxiliary components such as movable doll eyes and/or relatively more rigid limbs. By way of further example, the concept of having a foam doll body which possesses the advantageous surface and strength characteristics mentioned above is generally regarded in the doll industry as being inconsistent with the concept of having a body made from a given material which is integral and at least substantially continuous in nature in any cross-section between exposed surface portions thereof. In brief, the invention is directed to providing a body, whether it be used as a doll, as part of a doll, or for any other purpose, which possesses the above-listed and seemingly inconsistent properties, and to this end, the invention is further concerned with techniques for achieving the completely novel, and quite unexpected combination of advantageous factors.

Although, as indicated, the invention can be applied to various different types of articles having various different configurations, the invention at present finds particular utility when applied to the manufacture of shaped articles such as automobile arm rests and, even more particularly, to the manufacture of dolls and doll bodies. Thus, for simplicity, the instant inventive concepts are described herein with reference to the manufacture of dolls, although it is to be clearly understood from the outset that the invention is not limited to the manufacture of dolls or parts thereof, and instead, the explanation of the invention and the advantages attendant thereto are merely described herein with relation to dolls for exemplary purposes.

Foamable plastic compositions have been known for a number of years and such compositions have been used to make various products. At the same time, previous attempts to utilize such compositions in the molding of certain relatively thick articles and/or articles having complex shapes, such as dolls and/or parts thereof, have not been successful, apparently because the resultant product did not conform completely to the interior surface of the molding cavity as required and/or because the outer surface of the resultant article was not acceptable from the commerical standpoint and/or because the material changed color when exposed in use; and/or because the article did not possess sufficient strength properties for receiving and retaining auxiliary elements; and/or because the article was not waterproof; and/or because production techniques and equipment were not commercial. In the doll industry, for example, soft but solid bodies, as distinct from hollow bodies were normally made from fabric and stuffed with some filling material such as sawdust, cotton, or the like. Extremities were then attached thereto by sewing. In other instances, it was quite common for doll bodies to be formed from non-foamable polyvinyl chloride resins by rotational casting techniques which rendered a hollow body. The use of PVC foam to make an article such as a doll body was unheard of.

Thus, dolls and other such articles generally were made from non-foamable plastisols by rotational casting, from or with stuffed or filled bodies, and as from or with non-integral internal elements and separately attached or bonded outer cover layers in the form of a skin or shell. The industry concerned with such articles, accordingly, remained in need of an article having the advantageous combination of characteristics set forth above and a process of making the same from a suitable foamable plastic composition so that the inherent advantages of an ultimate foam product could be obtained.

SUMMARY OF THE INVENTION

The primary object of the present invention is to satisfy the aforesaid need. More particularly, it is a primary object of the present invention to provide a method of making, in a mold, a foamed article from an unfoamed plastic composition, and particularly foamable PVC plastisols, which compositions are preferably of the type which are sequentially first gellable and then formable when heated, color stable when exposed in use, and which method yields, through commercial techniques, an ultimate foamed article strong enough for commercial functional operations, sufficiently attractive in appearance, capable of providing reasonable definition of detail, if desired, having suitable resilience and elasticity, having an exceptionally tight skin structure, which makes the article waterproof, and generally possessing what might be termined proper "feel" characteristics.

Quite naturally, manufacturers of articles of the type in question have existent equipment which is being utilized in the production of non-foamed articles, and accordingly, a further significant object of the present invention is to provide a method of permitting the production of foamed articles which can be performed with the use of existing equipment, at most with minor modifications from a commercial standpoint.

To further improve uniform heat transfer and processing of the plastic composition within the mold, it is an important object of this invention to provide various techniques for precluding "hot" and "cold" spots in the heating medium, and more particularly to provide, in preferred embodiments, for heating of the molds submerged in and in direct contact with a liquid heating medium, in contrast to heating in a gaseous heating medium, for a portion or all of the processing steps. Such a procedure results in completely uniform heat transfer to all portions of the molds and the material therewithin while simultaneously effecting a quicker and more efficient heating due to the nature of a liquid heating medium.

Yet another objective of this invention is the provision of processing techniques for the formation of foamed articles which make most efficient use of the existing equipment.

Even further, another important object of the present invention is to provision of methods for producing foamed articles as prescribed, which can be successfully utilized without the necessity for special training of the production workers and which simplifiy production control by providing visually observable evidence of the completion of a key step in the foam processing so as to preclude or at least significantly diminish the production of rejects caused by "overblowing" or "underblowing" of the foamable material. Moreover, and of equal importance, it is an object of the present invention to provide techniques which immediately manifest their commercial application by virtue of their simplicity.

Yet another feature of this invention is the provision of a technique for the preparation of foamable plastic compositions which improves their storage stability and which yields a produce having a smoother skin, with better foam structure thereby again reducing the likelihood of rejects.

Additional, and equally important and significant objects of the invention include the following: (a) the provision of a foamed article formed from a foamable PVC plastisol composition, which article possesses the surface characteristics and advantages of unfoamed PVC plastisol compositions, and which article can properly be regarded as solid, although light; (b) the provision of such a PVC foamed article which is light in weight, and thus, even though solid, economical because, on a volume basis, only a relatively small amount of material need be used; (c) the provision of such an article and methods for making the same which, for the first time, permits the efficient use in making complex forms and shapes with the desired characteristics of foamable polyvinyl chloride compositions; (d) the provision of such methods which can be used with any one of a number of different types of heating devices including various commercial ovens such as casting ovens, elongated tubular conveyor ovens, and the like as well as heated vessels for high boiling point liquid heating media; (e) the provision of such an article which can include a body portion, arms, legs, and a head so integrally formed and joined as to yield a beautiful doll srtucture, which doll structure can incorporate movable eye components easily insertable therein, and which doll structure can further, if desired, and regardless of the eye structure, incorporate a bendable interior frame embedded in the article during the molding operation and sufficient to permit the doll to be manipulated to any one of a multiplicity of positions; (f) the provision of such methods for forming a "floppy" doll, that is, a doll having relatively thin hinged joints producing a rag doll appearance; and (g) the provision of such products and methods for producing the same which enable the article to be used in various forms, for example, as a one-piece doll structure where the less expensive dolls are concerned, and/or as a soft doll body, to which can be easily and movably joined other items such as limbs or a head, whereby the doll body will be light, soft, flexible and beautiful, and the appendages joined thereto will be movable with respect to the body, and yet of a relatively stiffer material capable of presenting finer and greater detail.

Consistent with this invention, a selected quantity of an unfoamed plastic composition, and preferably a foamable PVC composition, of the type which is capable of first gelling and then curing and foaming when heated, and color stable in use, is placed in a mold cavity. The mold is then preferably moved in the same manner as that in which a mold is moved during a conventional rotational casting operation with a non-foamable plastisol. During the movement, the mold, and in turn, the composition therein are heated in order to deposit a gelled layer of the plastic composition on the walls of the mold cavity. Further heating of the mold cures and foams the plastic composition. The initial heating and the further heating can all take place in a conventional rotational casting oven. However, according to a non-preferred, but acceptable procedure, after gelling a layer of the plastic composition on the walls of the mold cavity, the mold may be transferred to a heating tunnel wherein curing and foaming are initiated and/or completed. Finally, according to a preferred procedure of the instant invention, the further heating, and, in fact, even the entire heating cycle may take place with the molds submerged in direct contact with any high boiling point liquid heating medium, preferably a clear liquid such as glycerine, to insure uniform heating over the entire mold surface and, if desired, to facilitate visual observation of the molds, particularly toward the end of the heating cycle for control purposes to be described in more detail hereinafter.

The foamable PVC liquid composition fills less than the entire mold cavity when initially placed therein, but such quantity can be varied to thereby control the density of the ultimate article and the pore structure between respective opposed surface portions. The critical aspect of the invention, as presently understood, is that the material, when placed in the mold and subjected to the heating operation, initially forms a uniform gelled layer during the rotational casting movement and thereafter cures and foams so as to produce the solid or integral, continuous structure.

Notwithstanding the reference herein to gelling, curing and foaming the material by heating the same, the basic inventive concepts hereof may be useful with foamable plastisol compositions in which the activation of the foaming is effected by other means, such as, for example, a chemical catalyst or the like.

The term "continuous" or "at least substantially continuous" as used in the instant specification and in the appended claims with reference to the integral nature of the foam article of this invention shall be understood to include (a) foam articles having embedded elements such as wire skeletons or the like incorporated therein during the manufacturing operation as with certain embodiments of this invention to be described in more detail hereinafter; (b) foam articles having limited internal discontinuities in the foam structure, e.g., perforations or bores resulting from special molding techniques such as the technique described in copending application entitled Article Having Rotatable Connection Between Foamed and Unfoamed Parts, filed Nov. 30, 1966, in the names of Jacob J. Rosen and George Winn and bearing Ser. No. 598,084, assigned to the same assignee as the instant application, the subject matter of which is incorporated herein in its entirety by reference, also to be discussed in more detail hereinafter or other minor discontinuities in the foam structure resulting from a limited number of relatively enlarged cells in the center of the article or elsewhere throughout the article; (c) foam articles having surface depressions or sockets formed during the manufacturing operation as with the appendage sockets in the aforementioned application Article Having Rotable Connection Between Foamed and Unfoamed Parts or with the movable eye sockets utilized in certain embodiments of this invention to be discussed in more detail hereinafter and; (d) foam articles having embedded elements or materials over limited areas thereof such as would result from molding a doll around a pair of eyes removably carried by the mold interior or such as would result from molding an article about portions of a thin polyurethane or the like gasket element which extends partly into the mold cavity from between contracting mold parts in a multi-part mold to facilitate flash removal as dsecribed in my copending application entitled Method of Facilitating Flash Removal From Foamed Articles and Articles Produced Thereby filed on an even date herewith, bearing Ser. No. 679,430 and assigned to the same assignee as the instant application, the subject matter of which is incorporated herein in its entirety by reference. However, these terms are intended to exclude (1) a basically hollow article such as the conventional unfoamed plastisol or other rotationally cast hollow plastic dolls; and (2) an article having a filling which is not integral with the overlying skin or shell, such as, for example, a hollow vinyl doll stuffed with cotton.

Another important aspect of the invention concerns the technique by which the mold is moved at least during the initial or gelling phase of the processing steps. In this regard, and as explained more fully below, the mold is moved about a plurality of axes, or preferably simultaneous rotational and orbital paths throughout the gelling phase, and in some embodiments, throughout the entire operation. As will be explained further hereinafter, satisfactory results can be produced by subjecting the mold initially to such complex motion to distribute a gelled layer over the surface thereof, and thereafter merely continuing the heating operation to cause the curing and foaming, either with the mold stationary, preferably in a liquid heating medium or by passing the mold through an elongated heated tunnel while continuously moving the same longitudinally of the tunnel, and preferably, simultaneously rotationally about one of its axes.

In any event, according to this invention, at least during the latter part of the curing and foaming operation, the interior of the mold, while generally closed, communicates with the exterior of the mold at spaced locations. This concept will be discussed in more detail hereinafter. The communication between the interior and exterior of the mold cavity, referred to herein as "venting," in combination with the initial movement and gelling, curing and foaming steps has been found to produce the desired results. Motion of the mold alone during the entire gelling, curing and foaming operations, in the absence of venting, does not yield a suitable final product. Moreover, mere venting of the mold without motion to cause an initial distribution of the material in the form of a gelled layer on the mold wall, does not produce optimum results. Yet, with the combination of venting and movement during the appropriate times according to this invention, a foamed article of substantial thickness (e.g. five inches) can be obtained from color stable materials.

Even further, consistent with the techniques of this invention, complex shapes and configurations can be formed such as, for example, foamed bodies with the desired surface characteristics having prescribed socket configurations therein for receiving and retaining auxiliary elements such as eyes and/or auxiliary elements such as relatively harder limbs which are relatively movable with respect to the final product while cooperating therewith and retained in joined relation thereto. With respect to this latter construction, reference may be made to the aforementioned copending application entitled Article Having Rotable Connection Between Foamed and Unfoamed Parts for a full and complete discussion of a preferred technique and arrangement for providing such an article.

The final article can also be in the nature of what is known in the doll industry as a "floppy" doll in that it can have as a continuous structure, limbs and body portions which are joined together by thin elongated connections, all formed simultaneously with the body and limbs during the molding operation.

The invention thus provides results which many industries, such as the doll industry, have long sought but have not been successful in accomplishing.

The actual theory underlying the requirement for movement plus venting is not fully understood, but in any event, regardless of the mechanism involved, following the techniques of this invention as more fully explained in detail hereinafter, does provide a final product having physical characteristics and a surface appearance which are not obtainable with any other presently known methods and means.

It should be here noted that the advantages of the invention are probably most fully realized when a material such as foamable polyvinyl chloride plastisol is used to form the final article. In this regard, it will be appreciated that polyurethane foam has been used to produce foamed articles of substantial thickness. Yet, articles made from this material change color when exposed in use and moreover, with this material, it is virtually impossible to obtain a smooth surface. Even further, polyurethane foam articles do not possess the strength properties needed to suitably form small projecting elements, such as doll fingers or the like or to form sockets which are capable of receiving and retaining auxiliary elements such as the appendages of the aforementioned copending application entitled Article Having Rotable Connection Between Foamed and Unfoamed Parts. Viewed with these factors in mind, the invention provides a method of using a material, such as, and in particular, polyvinyl chloride plastisol to produce foam articles of substantial thickness with acceptable significant commercial properties—i.e., stability in color and smoothness of surface. This is the need mentioned above which has been long sought.

BRIEF DESCRIPTION OF THE DRAWINGS

The invention will be better understood, and objects other than those specifically set forth above will become apparent when consideration is given to the following detailed description. Such description makes reference to the annexed drawings presenting preferred and illustrative embodiments of the invention. In the drawings:

FIGURE 8 is a plan view of one section of a mold for forming an entire foam doll according to another embodiment of this invention, the interior cavity of this mold facing upwardly as with the mold section of FIGURE 4;

FIGURE 9 is a fragmentary view, partly in elevation and partly in cross-section of the head portion of a doll provided with undercut sockets for carrying preformed, preferably closable eyes with an eye being shown removed from the head;

FIGURE 10 is a fragmentary elevational view of a portion of a "floppy" doll produced according to another embodiment of this invention, alternate positions of the doll arm being shown in dotted lines;

FIGURE 10A is a fragmentary cross-sectional view through the thin hinged portion of a "floppy" doll formed according to a preferred embodiment of this invention;

FIGURE 12 is a fragmentary perspective view of a portion of a rotational casting oven showing a preferred device for supporting a plurality of molds for forming doll bodies during processing of foamed articles according to this invention;

FIGURE 15 is a diagrammatic showing of the overall preferred technique for processing foamed articles according to this invention.

Like reference characters refer to like parts throughout the several views of the drawings.

DESCRIPTION OF THE PREFERRED EMBODIMENTS

Figures 1, 2:
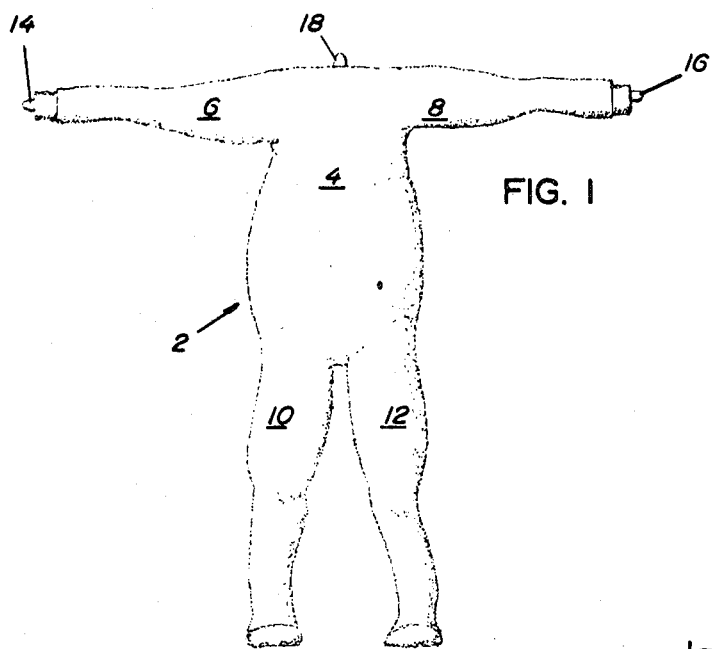
FIGURE 1 is a front elevational view of a doll body of the type made in accordance with one embodiment of the present invention.
FIGURE 2 is an enlarged fragmentary detailed view of a surface portion and adjacent interior portion of the doll body shown in FIGURE 1.

For purposes of fully understanding the invention, let it be assumed initially that the article to be formed is a doll body, such as the doll body 2 in FIGURE 1. The doll body 2 includes a torso 4, arms 6 and 8 and legs 10 and 12. The doll body may also, if desired, have an integral neck portion or an integral head portion as described in more detail with respect to subsequent embodiments of this invention. Further, the doll body may be formed with sockets for eyes as in the embodiment of FIGURE 9 or with sockets for movable appendages as described in detail in aforementioned copending application entitled Article Having Rotatable Connection Between Foamed and Unfoamed Parts. Additionally, the doll body may be provided with "floppy" arms/or legs as described in more detail hereinafter with reference to FIGURES 10 and 10A.

However, with the embodiment shown in FIGURE 1, attaching members 14, 16 and 18 project, respectively, from the outer ends of arms 6 and 8 and from the top of torso 4 (or from the top of a neck portion if the doll body includes such portion). These attaching members, as explained more fully below, preferably are the end portions of bendable strips embedded in the doll body 2. The attaching members 14 and 16 are suitable for coupling hands thereto and the attaching member 18 is suitable for connecting a head thereto, whereby the ultimate doll is a complete facsimile of a human. It is to be understood, however, that if desired, the hands and head can be formed integrally with the torso as described with respect to the embodiment of FIGURE 8 and that the invention allows the use of materials, such as foamable polyvinyl chloride plastisol, which has sufficient strength in the ultimate product to permit integral formation of small extremities, e.g., fingers, toes, nose or the like where the product is a doll. Also, the strength of such material allows the doll to be formed with undercut recesses or sockets for eyes or movable appendages.

The doll body 2 shown in FIGURE 1 can be regarded as presented on a reduced scale since the invention is adaptable to making large dolls, or other articles. Considering a doll itself, if the height of the doll body has a length, for example, on the order of 14 or 15 inches, the thickness of the doll in the torso may be 6 or 7 inches thick. Of course, these relative dimensions can be varied depending upon the shape of the doll torso, but still these dimensions illustrate the order of thickness which may be involved in producing articles of the type with which the invention is primarily concerned. To make a foamed article of this thickness by a molding technique so that the foamed structure is continuous rather than laminated for example was, prior to the invention, highly desired by the industry but, as indicated above, not heretofore achievable.

Aside from the considerations mentioned above, a commercially satisfactory ultimate article, such as a doll, must possess a suitable external appearance and a suitable external "feel." In this regard, a highly porous and/or pitted external surface for the ultimate article would not be suitable. This problem, however, does not exist with the instant invention. Instead, as shown in FIGURE 2, a doll produced in accordance herewith has a generally smooth outer skin portion 20, even though the integral adjacent and/or underlying interior portion 22 may have pores of substantial size. It is difficult in any illustration, such as, FIGURE 2, to present exactly the structure of the underlying interior portions of the body. Yet FIGURE 2, within the limits of schematic presentation, represents reasonably accurately the relationship between the interior portion of a doll produced in accordance herewith and the skin or external surface thereof. This does not mean that the invention cannot be used to produce a doll body or other article wherein there is a uniform pore size from the exterior surface to the internal portions thereof and/or wherein there is a gradient in pore size which is uniform in nature.

On the contrary, with the invention, various different sectional structures may be obtained as will be described in more detail hereinafter, but with minimal material, as indicated by FIGURE 2, the final requirement for certain articles, such as dolls, can be easily satisfied with a difference in pore structure between the interior portion of the doll and the surface portion thereof.

Figure 3:
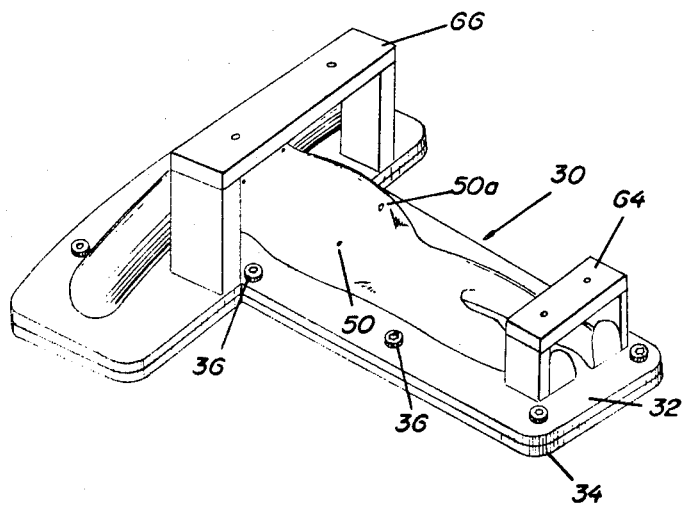
FIGURE 3 is a perspective view of one form of mold which can be used in carrying out the method hereof.

Having now set forth the background of the invention and the characteristics of a product produced in accordance therewith, attention can be directed to the method provided by the invention. In this regard, consider first FIGURES 3–7 wherein one embodiment of a method according to this invention is illustrated. FIGURE 3 shows a mold 30 formed of a pair of sections 32 and 34. The sections 32 and 34 are joined together by any suitable means, such as bolts or screws 36. The particular manner in which the mold sections 32 and 34 are joined together is insignificant insofar as the present invention is concerned. If sophisticated machinery such as rams or the like, is available to hold the mold sections in engagement, then such equipment can be used.

Additionally, thin sheets of polyurethane foam or modified polyurethane foam material may be freely carried between the mold sections 32 and 34 or selected portions of the mating edges thereof, with limited overlap into the mold cavity to preclude undesirable flash of the foamable plastisol and to provide a readily strippable flash formed of the polyurethane foam sheets, all as explained in more detail in the aforementioned copending application entitled Method of Facilitating Flash Removal From Foamed Articles and Articles Produced Thereby. Reference may be had to said copending application for a full and complete discussion of the techniques for producing such articles.

Figure 4:
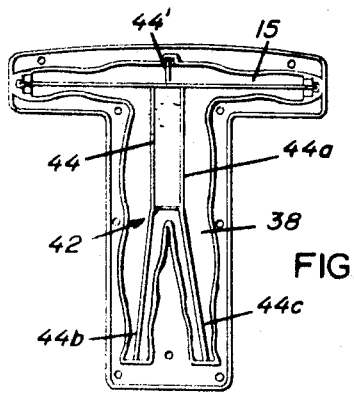
FIGURE 4 is a plan view to a smaller scale of one section of the mold shown in FIGURE 3, FIGURE 4 presenting such section with the interior cavity facing upwardly.

From the standpoint of the broader aspects of this invention, the important factor is that a mold is used having a mold cavity therein, which mold cavity defines the outer contour of the article to be formed. As shown in FIGURE 4, the mold section 32 has a cavity 38 therein, which cavity conforms essentially to one-half of the doll body 2 shown in FIGURE 1 (with FIGURE 4 being presented on a reduced scale). Similarly, the mold section 34 has a cavity 38' therein, which cavity cooperates in the ultimate mold with the cavity 38, so that the total doll body outer configuration is defined.

The respective mold sections 32 and 34 can have recesses such as the recesses 41 and 41' therein. These recesses, at the upper end of the mold cavity, are adapted to receive the attaching members previously referred to. The attaching members 14 and 16 can, for example, comprise opposite end portions of a bendable metal strip 15 which can be placed in the mold and supported, as shown, across the arms and top of the torso by recesses receiving opposite ends thereof. Similarly, the attaching member 40 can be part of a frame 42 consisting of a group of members, for example, 44, 44a, 44b and 44c, which extend throughout the mold in spaced relation to the walls of the cavity thereof. It will be understood that it is not essential to provide a frame such as the frame 42, and for many articles, no attaching members would be required. Still, the invention envisions the use of such a frame, or any other suitable frame, and attaching members, particularly when the invention is used in the production of doll bodies.

Figure 5:
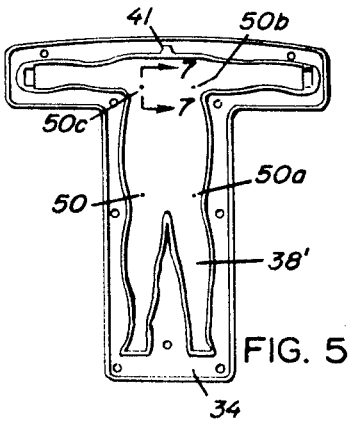
FIGURE 5 is a plan view also to a smaller scale of the other section of the mold shown in FIGURE 3, FIGURE 5 presenting such section with the mold cavity exposed upwardly as in FIGURE 4.

An extremely significant characteristic of the mold section resides in the inclusion in the mold section 34 of a group of apertures or holes 50, 50a, 50b and 50c. These apertures, as shown in FIGURE 5, are spaced apart from each other with one group of apertures being in the upper portion of the cavity section 38' and with the other group being in the lower portion thereof, but with all the apertures preferably being in the torso or thicker section of the mold cavity and in turn adjacent the thicker section of the article to be formed therein.

Figure 7:
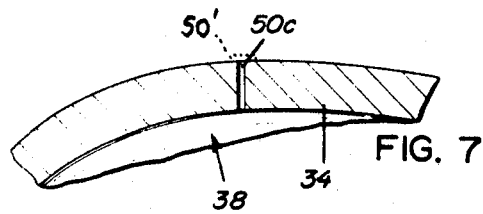
FIGURE 7 is an enlarged fragmentary detailed sectional view, taken on the line 7—7 of FIGURE 5, and showing a vent aperture incorporated in the mold in accordance herewith, a small circle of masking tape or the like being shown in dotted lines as covering the exterior of the vent aperture, if desired, for a purpose to be described in more detail hereinafter.

In FIGURE 7, a fragmental part of the mold section 34 is shown which includes the aperture 50c. It will be noted that this aperture provides a relatively small passageway communicating the interior mold cavity with the external atmosphere. Viewed in this light, the respective apertures 50, 50a, 50b, and 50c provide relatively small passageway means which communicate the cavity of the mold with the surrounding atmosphere.

The exact location, size and number of apertures incorporated can be varied depending on the article to be formed and depending on the venting of the mold desired for the particular article. It is essential, however, that passageway means communicate the interior of the mold with an environment under less pressure than that which will be experienced in the mold during the forming and molding operation and particularly during the latter portion of the foaming phase when the internal pressure in the mold has increased due to the decomposition of effect of the blowing agent or agents. Use of the currounding atmosphere, that is, the air in an oven or the like, as the reduced pressure environment is highly convenient and desirable for some applications. Yet, any reduced pressure zone or source could be incorporated without departing from the scope and spirit of the invention. In fact, a liquid heating medium can be used as the reduced pressure surrounding environment with which the passageway means communicate the mold interior, as least during the latter portion of the curing and foaming phase, and when a liquid medium is used, there are certain advantages achieved. In particular, there is, as explained below, more uniformity in heating and in turn, less danger of facing rejects.

In performing the method according to the basic technique of this invention, an unfoamed color stable plastic composition which is first gellable and then curable and foamable when heated, e.g., foamable polyvinyl chloride plastisol, is used as the material initially placed in the mold. To this end, a predetermined amount of the unfoamed plastic composition is introduced into the mold cavity. It is placed preferably in one of the mold sections before the mold sections are joined together or brought into engagement to close the mold cavity. The amount of material which can be used and the exact nature thereof can be varied from article to article. However, it has been found that vinyl plastics are particularly suitable and with a composition consisting essentially of polyvinyl chloride, a polyvinyl chloride plasticizer or plasticizers, a blowing agent or blowing agents, stabilizer or stabilizers, colorants or pigments, fillers or other modifying agents, a commercial product is easily made. A plastisol is defined as a dispersion of vinyl chloride polymer in a liquid plasticizer and commonly includes, for the manufacture of a foamed article, polyvinyl chloride polymer if a homopolymer is to be made, or copolymers of vinyl chloride with vinylidene chloride, vinyl acetate or ethyl maleate. Generally at least 35 parts, and even up to 300 or 400 parts by weight of the liquid plasticizer are used for each 100 parts of the vinyl chloride polymer. Common plasticizers include such well-known materials as dioctyl phthalate, butyl decylphthalate, didecyl phthalate, dioctyl adipate, dioctyl sebacate, tricresyl phosphate, trioctyl phosphate and acetyl tributyl citrate. Various blowing agents are well known for use with vinyl plastisols including heat decomposable blowing agents, generally those releasing nitrogen, although other gas-releasing blowing agents and even chemical blowing agents are usable with the instant inventive concepts. Since polyvinyl chloride, polyvinyl chloride plasticizers, blowing agents, stabilizers, etc., suitable for use therewith provide foamable plastisols which gell, cure and foam and are well known, further explanation of the foamable material introduced into the mold cavity is unnecessary.

After the unfoamed, but foamable plastic composition is placed in the mold cavity, with the amount by volume in any event being less than the total volume of the cavity, the cavity is closed, as indicated, with the mold sections 32 and 34 in pressure engagement with one another and/or locked together. The mold 30 may then be affixed to a conventional support in a rotational casting oven, although as will be explained in more detail hereinafter, certain improved supporting means shown herein provide more uniform and efficient production of foamed articles in accordance herewith.

Figure 6:
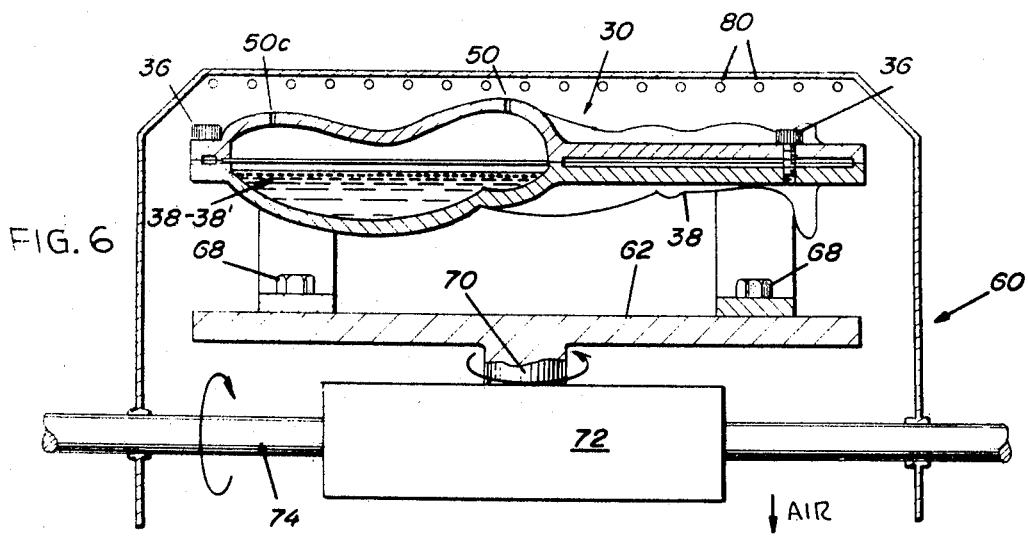
FIGURE 6 is a partly sectional, partly schematic side view of one embodiment of an apparatus and associated mold suitable for use in performing certain steps of the invention hereof.

Solely for illustrative purposes, FIGURE 6 is presented to explain the operation and construction of a conventional rotational casting oven. In FIGURE 6, the oven is generally designated by the numeral 60 and the mold support plate by the numeral 62. The mold 30 shown in FIGURE 3 is coupled to the plate 62 by means of the brackets 64 and 66 carried on the mold section 32, such brackets including suitable apertures therein so that bolts 68 can be passed therethrough to cooperate with threaded apertures (not shown) in the plate 62. The plate 62, as conventional, has a shaft 70 projecting therefrom, which shaft passes into a gear box or gear arrangement 72 that in turn cooperates with a so-called center shaft 74 extending through the oven 60. The center shaft 74 rotates about its longitudinal axis, and this results in orbital movement of the mold 30 about the shaft 74. At the same time, the gear arrangement 72 results in rotation of the shaft 70 and in turn rotation of the plate 62. The mold 30 thus, while orbiting about the axis of the shaft 74, also rotates about the axis of the shaft 70, such respective axes being disposed angularly, and in particular, perpendicularly, to one another. Rotational casting apparatus which incorporates an arrangement such as described with a central shaft extending through the oven, with a gear arrangement and the like, is well known, and further description of this apparatus is, therefore, believed unnecessary. The important point to understand is that the mold 30 is moved while in the oven 60 and preferably moved simultaneously orbitably about the axis of shaft 74 and rotationally about a second axis, namely, the axis of shaft 70, disposed at an angle to the first mentioned axis (axis of shaft 74).

The oven 60 is provided with any suitable heating means indicated schematically by the heaters 80 in FIGURE 6. The unfoamed material is thus distributed throughout the cavity 38–38' during the initial moving and heating operation and preferably gelled in the form of a layer on the inner walls of the cavity. In accordance with the one embodiment of the basic techniques of this invention, heating may be continued in the oven 60 during the plural axes rotation so that the foaming ingredient of the plastic composition, the so-called blowing agent, foams the material whereby it conforms to the interior of the cavity 38–38'. Significantly, and of extreme importance, is the fact that the cavity 38–38' is vented through the apertures 50–50c during this foaming and moving operation and preferably during the entire heating procedure.

In this regard, for all of the embodiments hereof, the exterior of the passageway means or apertures 50–50c may be initially covered by small patches or discs of paper masking tape or the like such as shown in dotted lines at 50' in FIGURE 7. The purpose of such patches is not to prevent venting of the mold interior and, as will be further explained hereinafter, such discs do not, in fact, prevent venting during the critical portions of the molding cycle. However, since the plastic material charged into the mold is initially in a liquid state, minute quantities of the same may escape through the vent apertures when the mold is first moved. From a practical standpoint, when a single mold is being processed, the material which escapes from the tiny vent apertures is insignificant. However, when a plurality of molds are being simultaneously processed as, for example, in the embodiment of FIGURE 12 to be discussed in more detail hereinafter, such small bits of material from one mold tend to become deposited on adjacent molds, and after heating of the molds, form insulated areas on the mold surfaces precluding uniform heating of the material therein and sometimes resulting in defects in the surface of the products. The masking tape patches preclude any such leakage while providing an insignificant barrier to venting when the pressure builds up inside the mold. In fact, it has been found that such patches quickly become loosened at least to a sufficient degree to permit the desired venting and frequently even drop from the mold during processing. For some reason, the patches are not burned in the oven, although no significant problem would appear to exist even if they did burn since they are so small.

It should be noted that since the patches 50' are affixed to the exterior surface of the mold, a passageway still remains through the thickness of the mold wall terminating in an aperture in the interior mold surface. This passageway alone provides an area of reduced pressure outside the gelled layer formed on the surface of the mold cavity, particularly when pressure within the mold increases due to foaming of the gelled layer. Further, the very presence of the apertures in the interior mold surface and the passageways through the mold wall provides points of weakness in the gelled layer through which the material can "burst" when the internal pressure caused by foaming becomes sufficient.

Returning now to the general discussion of the basic process techniques, one can, if desired, periodically reverse the direction of rotation of the mold about the shaft 70, and even the direction of orbiting of the mold about the shaft 74 to improve the distribution of the material within the mold cavity, but reversing is not critical in any event.

The smoothness of the interior surface of the mold cavity is significant to obtaining a final product with desired smooth surface characteristics, and such mold surface should not be porous.

Reviewing the foregoing, it will be understood that the invention provides a method of making, in a mold cavity, a foamed article, such as a doll body having a torso and arms and legs, from an unfoamed plastic composition, which composition is foamable when heated and which composition is stable in color. The outlined steps in the preferred procedure involve introducing a predetermined amount of the unfoamed plastic composition into the mold cavity, moving the mold cavity with the composition therein; while moving the cavity, heating the same sufficiently to gell a layer of the plastic composition on the interior surface of the mold, and then further heating the cavity to cure and foam the plastic composition while communicating the cavity through relatively small passageway means with an environment under less pressure than that existent within the cavity during the foaming step, and maintaining the cavity closed except for the communication therewith through the passageway means, whereby the plastic composition is foamed to fill the cavity with the exterior surface of the resultant article conforming with the surrounding surface of the cavity. The method, as indicated, is particularly applicable in the formation of dolls and was described for this purpose even though the invention is not so limited and can be applied to other articles, for example, automobile arm rests and the like.

Where dolls are involved, however, attaching members and/or bendable rods can be associated with the ultimate article. With other articles such as automobile arm rests, means for attaching the same to an automobile door may be readily embedded during the foaming operation in any suitable manner.

In the preceding description, the exact amount of foamable material introduced into the mold initially and the exact size of the venting apertures have not been discussed in detail because the quantity of material introduced into the mold and the size of the apertures, as suggested above, will vary depending on the particular ultimate article and the internal structure desired. By way of example, for a doll body of normal proportions about 11 inches long, four spaced vents about $\frac{1}{32}$ inch in diameter are satisfactory, but these specific dimensions are not critical to the instant invention.

The heating temperatures and the time during which the curing and foaming operations take place are further factors not considered in detail above. Here again, the temperatures used will depend upon the so-called "release temperature" of the blowing agent and the gelling and/or curing temperature characteristics of the particular material used in the method. Release temperatures and gelling and/or curing temperatures for various types of foaming compositions, including those mentioned above, are generally well known to those familiar with the art, and thus through common available knowledge and/or mere mechanical skill, the heating temperatures and operating times can easily be established for any given article made consistent with the invention.

Referring now to FIGURE 8, one half section of a mold is shown at 75, this mold being adapted to produce an entire foam doll including integral torso portion 81, legs 82 having feet 83, arms 84 having hands 85 and a head 86. Of course, a mating mold section (not shown) would be used in conjunction with the section 75 as with the mold sections shown in FIGURES 4 and 5, the mating mold section including vent apertures according to this invention.

If desired, a bendable frame 87 may be incorporated in the doll product in a manner similar to the frame 44 shown in FIGURE 4. The frame 87 may include torso elements 87a, leg elements 87b, arm elements 87c and head elements 87d, all secured together in fixed relationship. Recesses 88 may be provided in the mold element 75 for engaging the terminal ends of the head elements 87d of the frame 87, the remainder of the frame being maintained in position by this engagement or in any other desired manner. With the arrangement shown in FIGURE 8, the terminal ends of the head elements 87d of the frame 87 will extend a short distance beyond the top of the head of the finished doll, preferably as little as approximately $\frac{1}{16}$ of an inch, and will thereby provide means for attachment of a wig to the doll's head.

Thus, it will be seen that an entire integral, continuous doll structure may be made, with or without a frame, utilizing the concepts of this invention. One portion of a preferred doll's head is shown in FIGURE 9 at 90 and will be seen to include an undercut socket or recess 91 adapted to receive a preformed eye member such as the element shown at 92, which may, if desired, be of the type which closes when the doll is disposed horizontally. The strength of the polyvinyl chloride plastisol foam used according to this invention is such that it will readily retain an auxiliary element such as the preformed eye 92, while its resiliency permits the undercut socket 91 to be easily stretched for initial insertion of the eye element. Similarly, the inherent resiliency of this material facilitates removal of the head 90 from socket forming members (not shown) carried by the mold for defining the recess 91 in an obvious manner.

Referring now to FIGURE 10, a portion of what has been termed by the industry as a "floppy" doll is designated generally by the reference numeral 94 and will be seen to include a torso portion 95 with an arm element 96 integrally secured thereto by a relatively thin connecting portion 97 formed by providing a relatively narrow channel in the mold for the expanding foam material. Because of the relatively thin connecting portion 97, the arm element 96 will "flop" back and forth between the alternate positions 96' shown in dotted lines to provide a simulation of a rag doll. It should be noted that with this embodiment, as with the other embodiments of this invention, the formed article is integral and continuous and includes an enveloping skin portion of the type shown at 20 in FIGURE 2. Of course, the legs and head may be integrally secured to the body or torso section of the doll by similar relatively thin connecting portions. The method of forming this doll is basically the same as the methods disclosed previously, with the venting taking place in the torso portion of the mold cavity.

According to a preferred technique for forming "floppy" dolls, the relatively thin channel in the mold structure which forms the connecting portion 97 is enlarged over a limited area of its width. This provides additional communication between, for example, the arm portion of the mold and the torso portion thereby producing, in effect, a means for interior venting of gases from the arm portion to the torso portion facilitating the foaming operation and precluding an undue build-up of pressure in the arm portion with attendant damage to the final product. Such a limited area will be filled with foam material in the final product to produce a small rib on the hinged connecting portion 97 as shown at 97a in FIGURE 10A. This rib 97a due to its limited area will not interfere with the "floppy" effect, but will result in a product having better characteristics.

Figure 11:
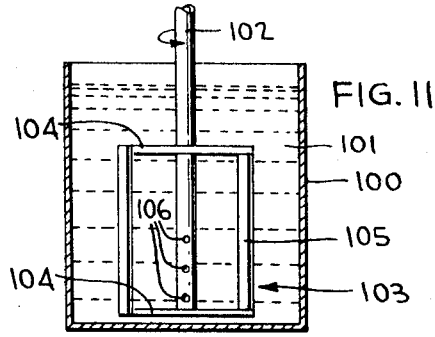
FIGURE 11 is a schematic illustration of a preferred technique for pretreating the plastic composition according to this invention in order to improve the storage stability of the same and provide a more uniform and aesthetically attractive foamed product.

With reference now particularly to FIGURE 11, a technique is illustrated therein to overcome one reason for non-uniformity in product characteristics obtained from conventional foamable plastic compositions such as foamable polyvinyl chloride plastisols. Such materials are usually mixed and placed in closed drums for transfer from the plastics manufacturer to the doll or other article manufacturer. It has been found that the use of materials processed in this manner results in a lack of uniformity in foamed products produced therefrom. Such non-uniformity is obviously undesirable and attempts have been made heretofore to avoid this problem, but without any significant success. It has now been discovered that surprisingly improved results can be effected when the plastic composition is pre-treated by the ultimate user as shown in FIGURE 11 by subjecting the same to a mechanical mixing and an aeration. For example, in FIGURE 11, a container 100 such as a drum of a foamable plastic composition 101 is mechanically agitated such as by a rotationally driven stirrer 102 having a paddle 103 attached thereto. The paddle 103 preferably includes a pair of cross bars 104 and oppositely disposed connecting elements 105 which will mix the plastic composition 101 without producing a "whirlpool" effect. The stirrer 102 is tubular and the material is simultaneously aerated by passing air through the tube and bubbling the same through the material from the apertures 106.

It will be understood that the specific mechanisms utilized for the agitation and aeration are not, in and of themselves, critical to the instant invention, but rather, that the improved product characteristics result merely from the simultaneous and/or consecutive combination of a mechanical mixing and an aeration of the plastic composition. Mere agitation by itself has not provided any significant improvement in the uniformity over extended periods of use of such plastic compositions, nor has mere aeration or even agitation of the material by bubbles or air. However, the simultaneous and/or consecutive application of the two has resulted in substantial uniformity throughout the plastic composition for periods of 24 hours and longer. Further, such treatment has resulted in a smoother surface and better foam construction in the final product.

Thus, it is preferred that a plastic composition to be utilized according to any of the techniques of this invention be pre-treated by simultaneous and/or consecutive mechanical agitation and aeration to provide optimum characteristics in the final product, although it is to be understood that agitation and aeration are not critical to the more basic aspects of the invention.

Yet another processing technique which has been found to facilitate the production of better products according to this invention involves the method of metering the plastic composition into the mold. As will be obvious, it is desirable from an efficiency standpoint to utilize a means for metering selected quantities of the plastic composition into the mold from a relatively large source of the same. In general, such plastic materials are delivered and handled in 55-gallon drums and it has been found that when a conventional metering device is associated with such a drum, the relatively high pressure resulting from the head of material within the drum adversely affects the characteristics of the final product. Ordinarily, such material is fed directly from an aperture in the bottom of the drum into the metering device, a procedure which results in a great pressure behind the material and a shock to the material as it is forced into the metering device. In has now been found that if a feeding tube connected to the metering device is extended into the drum so that it includes a closed end spaced from the drum wall and extending within the material, with several small apertures adjacent the closed end of the feeding tube within the drum, as contrasted to the conventional technique wherein the feeding tube is merely connected to an opening in the drum wall, the aforesaid difficulties are obviated. This technique reduces the pressure on the material so that it flows gently into the metering device rather than being forced into the metering device with a great shock as it contacts the cavity walls within the metering device.

This feature is believed particularly useful in maintaining the effects of mixing and aerating the material as shown in FIGURE 11 since the shock produced by more conventional metering techniques has a tendency to de-aerate the material and reduce the advantages attendant to the mixing and aerating step.

Although a conventional rotational casting apparatus as shown, for example, in FIGURE 6, may be utilized in accordance with the broader concepts of this invention, a multiple mold supporting device such as shown in FIGURE 12 has certain advantages which will be recognized from the following description. A portion of a conventional rotational casting oven is shown at 111 as including a center shaft 112 and a pair of plates 113 carried by cross-shaft 114 operatively connected through a conventional gear arrangement for rotation at right angles to the center shaft 112.

A pair of supporting devices are shown in FIGURE 12, each designated generally by the reference numeral 115 and each comprising a plate member 116 which preferably is a separate element securable in any conventional manner such as screws or the like 117 to plates 113 of the conventional rotational casting oven. The use of two plate members 116 such as has been shown in FIGURE 12 connected to opposite portions of the rotational casting drive mechanism has the advantage that one plate member may be removed for subsequent processing of the molds, for example in the manner to be described in more detail hereinafter with reference to FIGURE 13 or 14 while a new plate member carrying additional molds may be inserted in lieu thereof.

Although four molds have been illustratively shown in FIGURE 12 as clamped to each plate member 116, it will be recognized that any desired number of molds may be utilized and that the arrangement and number of molds is merely limited by the size of the oven and/or the plate. Further, although the molds shown in FIGURE 12 have a configuration for forming a doll body of the type shown, for example, in FIGURE 1, it will be readily recognized that the molds may be of the type designated for forming dolls or doll parts as in any of FIGURES 8–10, dolls for carrying separate appendages as in the aforementioned copending application entitled Article Having Rotatable Connection Between Foamed and Unfoamed Parts or any other foam article in accordance with the instant inventive concepts. In any event, it is preferred that the molds be staggered as shown in FIGURE 12 in order to provide the greatest access to the individual surface portions of each mold by the heating medium in the oven.

Each plate member 116 includes a plurality of mold clamping means each designated generally by the reference numeral 118 for use with a modified and preferred mold 120. The molds 120 are shown as carrying shielding devices 122 for limiting the amout of heat reaching areas of the mold cavity of smaller cross-section such as the arms and neck portion, but the type of shielding, and whether or not it is used at all may depend at least in part on the position of the extremities of the article relative to the body during the processing consistent with the invention. The various modified apparatus shown generally in FIGURE 12 is described in more detail in aforementioned parent application Ser. No. 611,392 and reference may be had to such application for further discussion of the modified mold 120, one type of shielding means 122, overall multiple mold supporting means including the clamping means 118, and special equipment for parting the mold sections from each other when the product is completed. Additionally, in such application reference is made to special baffling means for improving heat transfer in the rotational casting oven 111. However, for purposes of the instant application the embodiment of FIGURE 12 is described broadly to provide further insight into techniques for producing foamed articles according to the instant inventive concepts and equipment that can be utilized effectively in commercial applications.

It is of interest to note that with the arrangement of the multiple mold supporting means shown in FIGURE 12 the individual molds 120 are each secured in a manner such that the major portion of their exterior surfaces is supported in freely upstanding relationship to permit relative uniformity in accessibility by the heating medium to all portions of the mold. This contrasts with the arrangement of FIGURE 6 wherein the longitudinal axis of the individual mold is arranged parallel to the supporting plate and wherein a spacing between these elements must be relied on for access of the heating medium to the underparts of the mold. Further, as indicated, uniform heating of the various portions of the mold can be improved, if necessary, by the use of a shielding means such as 122 which may or may not be perforated or alternatively, if desired, the molds may be either formed with relatively thick wall sections or with an insulating coating surrounding those areas of thinner construction such as the arms and neck thereby partially shielding the material within these sections from the effect of the heating medium in the oven and reducing the likelihood of overheating such material in these sections.

In accordance with the broader concepts of the instant invention the entire molding process including the gelling, curing and foaming phases of the instant invention may be carried out in a rotational casting oven such as shown in FIGURE 12 and in a manner similar to the techniques described hereinabove with reference to the embodiment of FIGURE 6. However, it has now been found that improved results can be realized by utilizing a liquid heating medium in place of the ordinary oven for a portion or all of the processing steps. For further discussion of such a procedure, reference is made to FIGURE 13 wherein one of the mold supporting devices 115 of the arrangement of FIGURE 12 is shown as submerged in a vessel 125 containing a high boiling point liquid heating medium 126. It is desirable that the liquid heating medium 126 have a boiling point sufficiently above the temperature necessary to effect the curing and foaming of the plastic composition in the molds 120 in order that the heating medium 126 does not evaporate relatively quickly. With the embodiment of FIGURE 13, the plastic composition is initially gelled in a rotational casting oven of the type shown in FIGURE 12 and then one of the mold supporting plates with multiple molds thereon is removed from the oven and submerged in the liquid heating medium 126 to effect curing and foaming. In such an instance, the heating medium 126 is raised to a temperature below its boiling point, but sufficient to effect curing and foaming of the gelled layer within the molds 120. The temperature of the heating medium 126 may be maintained at any desirable level by any suitable means. For example, the vessel 125 can be heated by utilizing pipes in the base portion thereof through which hot gases pass, although, if desired, electrical heating elements schematically designated by the reference numerals 128 may be directly incorporated in the walls of the vessel 125 in a well known manner. Alternately, it is obvious that any other conventional heating means may be utilized to raise the temperature of the heating medium 126 and maintain the same at a desired level.

While various liquid media can be used which can be dark, light, clear or opaque, it is desirable that the same be relatively clear so that the molds 120 can be visually observed during the foaming operation whereby the emergence of the "spaghetti" from the vent apertures in the molds 120 can function as a signal to the operator that curing and foaming has been completed. By way of example, glycerine is a heating medium which satisfies the aforementioned desirable properties, but any other liquid with a relatively high boiling point can be used without departing from the invention.

The use of a liquid heating medium of the type described hereinabove with the molds submerged in direct contact therewith provides the highly significant advantage of more uniform heat transfer to the individual molds and each and every portion thereof than can be effected in an ordinary oven of the type shown in FIGURE 6 or FIGURE 12. Regardless of the precautions taken, it is well recognized that where dry air is used for heating as in an oven, there is a tendency for "hot" and "cold" spots which can produce nonuniformities in the product. With a liquid heating medium, uniform overall heating is much more readily accomplished.

The liquid heating medium 126, while providing a pressure outside of the molds 120 which may be greater than an ordinary air atmosphere, may still be considered as a reduced pressure environment which permits the venting necessary to the instant inventive concepts since the pressure within the mold cavities, particularly during the latter portions of the foaming phase are sufficiently in excess of the pressure provided by the liquid heating medium on the exterior of the molds that the product skin is readily broken at the locations of the vent apertures resulting in extrusion of the foam material through the vent passageways in the manner described hereinabove with reference to the earlier embodiments thereby precluding the formation of voids or defects in the surface of the product and providing a smooth external skin of the type shown in FIGURE 2 capable of producing a high definition of detail and a commercially acceptable "feel." Additionally, a product formed in this manner has a closed cellular configuration and is waterproof as with the products formed in the manner of any of the other techniques thereof. In any event, utilization of the technique of FIGURE 13 has produced a significant reduction in rejects from the standpoint of both "underblown" and "overblown" products, as well as from the standpoint of products having surface defects caused by non-uniform heating. Reduction in rejects is the result of the more uniform heating provided by the liquid heating medium. Yet, the visual control provided by the ability to watch the molds for the production of "spaghetti" also provides a means to further reduce rejects. The commercial significance of diminishing rejects is quite obvious.

From the foregoing, there are two points to note: (1) the molds are not necessarily moved during the curing and foaming operations, and (2) while the vents are normally blocked when the composition is gelled, whether or not masking tape "spots" are used, it is essential that the vents communicate with an environment which permits excess gas pressure to escape through the product surface and the vents once the gas pressure within the article being formed exceeds a predetermined level. This environment can be air, other gas, liquid, or anything else which permits the release of the excess gas.

The mold supporting plate, when removed from the rotational casting oven 111, can be submerged with the plurality of molds carried thereby in the liquid heating medium 126 to provide direct contact between the heating medium and the molds, and subsequently removed therefrom in any conventional manner. For example, the mold supporting means 115 can merely be carried by an elevator (not shown) which is lowered and raised by any conventional mechanism schematically designated by the double headed arrows 130 in FIGURE 13.

Although the use of a liquid heating medium has been described hereinabove particularly for use during the curing and foaming phase of the processing steps of the instant inventive concepts, it is contemplated that the entire operation, including the rotational casting of a gelled layer within the mold cavity and the curing and foaming can be effected in a liquid heating medium. This would provide more uniform heating of the molds throughout the processing of the material therewithin resulting in even further improved properties in the final product.

The use of a liquid heating medium is considered preferable according to the instant inventive concepts for product quality. Further, it should be emphasized that the use of liquid heating medium also permits greater speed in achieving satisfactory results. The concept of speed of production cannot be over stressed since with the use of a liquid heating medium it has been found that total processing time can at least be cut in half over the time required with dry gas ovens. Yet, satisfactory results can be obtained with an ordinary rotational casting oven of the type described with references to either FIGURE 6 or FIGURE 12.

Figure 14:
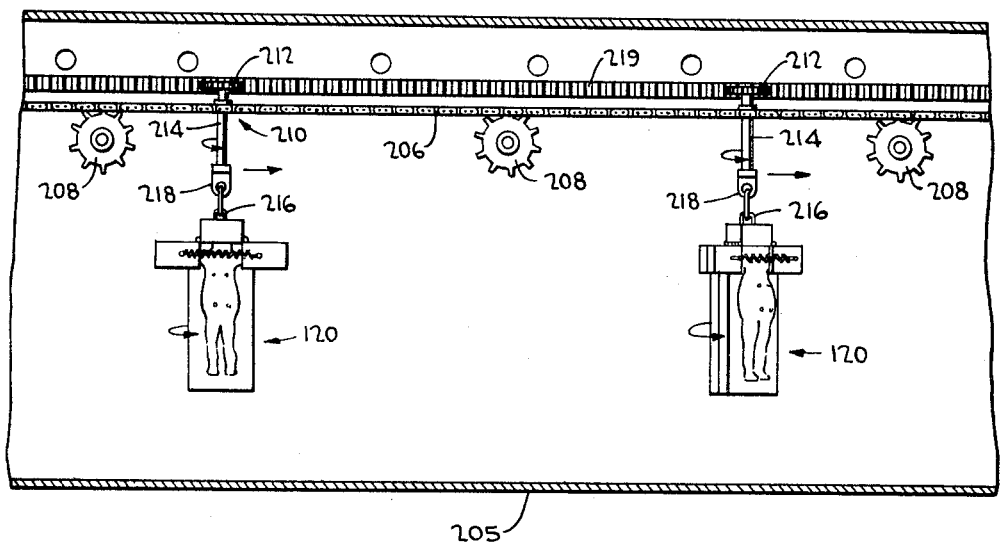
FIGURE 14 is a fragmentary schematic view of a heating tunnel for processing the molds during the foaming operation according to an alternate technique of this invention.

Although not preferred, it should be understood that the molds can be also processed in a heating tunnel 205 once the material has been gelled in the rotational oven. As shown in FIGURE 14, the molds 120 can be continuously carried through heating tunnel 205 by a continuous chain 206 driven by sprocket means 208 or other suitable means. The length of the tunnel 205 can be such as to insure complete curing and foaming of the plastic composition within the molds 120.

Preferably, each mold is rotated about its vertical axis while passing through the heating tunnel 205 in any desired manner, a mechanism designated generally by the reference numeral 210 being shown as illustrative. This mechanism includes for each mold, a pinion 212 fixedly secured to a rotatably supported shaft 214. Any conventional means may be utilized to connect a mold 120 to its carrying shaft 214, an eye 216 on the top of the shielding means 122 conveniently engaging a hook 218 carried by the shaft 214. Of course, if the shielding means 122 is not utilized, other connecting means may be readily substituted for the arrangement shown in FIGURE 14. The pinion 212 engages a rack 219 during the travels of the chain 206 through the tunnel oven 205 to thereby rotate the shafts 214 and the molds 120 about a vertical axis.

Figure 13:
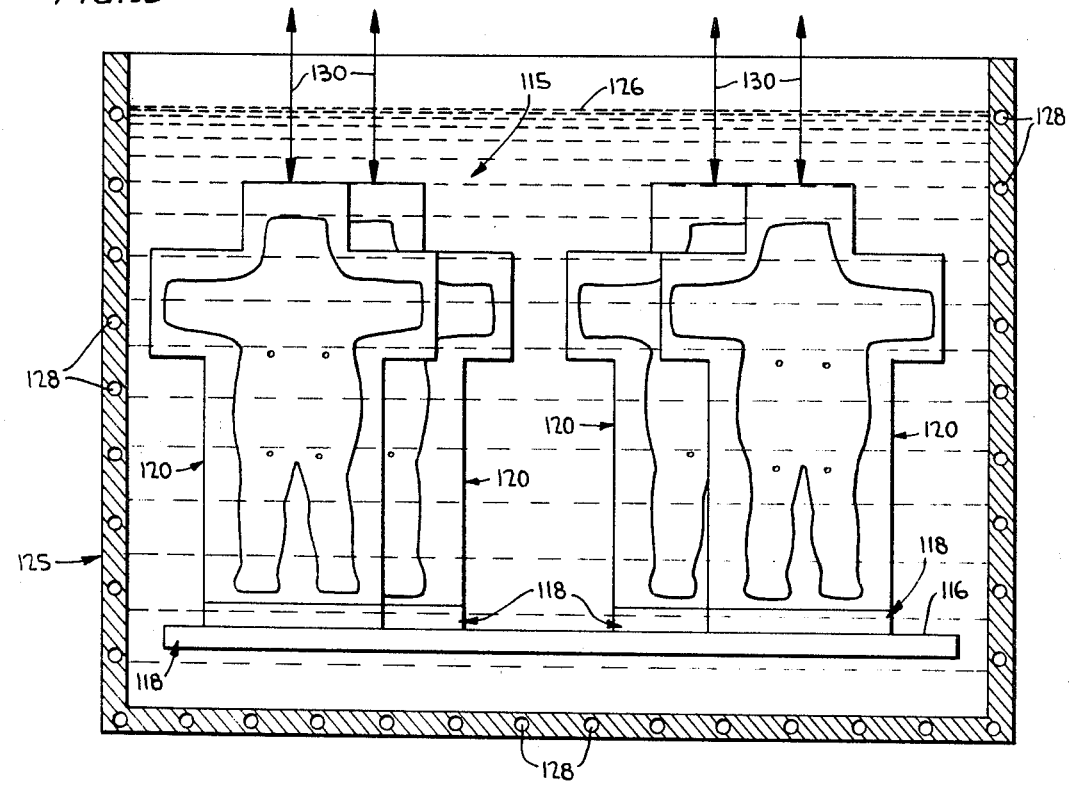
FIGURE 13 is a schematic view, partly in cross-section, showing an exemplary apparatus for carrying out an alternate and preferred technique for heating the molds, at least during the curing and foaming phase of the procedure hereof, in a liquid heating medium to improve uniformity in heat transfer and visual observation of the molds for control purposes.

As mentioned previously, although continuation of the plural axes rotation throughout the curing and foaming operation is desirable, and use of the heating tunnel in which the molds are moved longitudinally and rotated about one of their axes is an acceptable alternative, the broadest concepts of this invention include curing and foaming the gelled layer while the molds are stationary and, in fact, when a liquid heating medium is utilized as in FIGURE 13, such stationary curing and foaming has been found to be particularly satisfactory.

Since there is substantial pressure built up within the molds during the foaming operation, there are some few instances when it is difficult to strip the final product from the mold sections without damaging the surface of the product. It should be emphasized that this is not ordinarily the case. However, if desired, one technique which can be utilized to initially separate the product from the cavity walls is to introduce air under pressure through one of the vent passageways. The pressured air is then admitted into the mold before the mold is parted and functions to gently separate the surface of the product from the molding surface in an efficient manner. The screws or bolts connecting the mold sections are released before such pressured air is admitted.

Parting of the mold sections may be facilitated by the use of equipment such as shown in aforementioned copending parent application Ser. No. 611,392, although any conventional parting techinque may be utilized. The final product generally contains a small amount of "flash" along the seam formed by the split mold which may be readily removed, in any conventional manner, along with any of the "spaghetti" still attached to the product. Removal of such "flash" may be facilitated by utilizing a technique such as described in the aforementioned copending application entitled Method of Facilitating Flash Removal From Foamed Articles and Articles Produced Thereby.

Referring now to FIGURE 15, a schematic process diagram is shown of the entire preferred operating technique according to this invention. The plastic composition, which is preferably a foamable polyvinyl chloride plastisol as indicated hereinabove, is preferably mixed and aerated according to the procedure described in connection with FIGURE 11 and a selected volume of the same, smaller than the volume of the cavity within the mold, is poured into one mold section. The mold section is then closed and, if desired, a shielding means, is associated therewith. A plurality of filled molds are preferably secured to a plate such as shown in FIGURE 12, which is then operatively associated with a rotational casting mechanism either in an oven or in a liquid heating medium. The molds are then rotated about a plurality of axes to at least distribute the plastic composition throughout the cavity while heating the same sufficiently to form a gelled layer on the cavity walls. As indicated above, this plural axes movement can be continued through the curing and foaming operation or, alternatively, the molds may be removed from the rotational casting mechanism after the gelling operation and either submerged in a liquid heating medium or passed through a tunnel oven or, in fact, maintained stationary in an ordinary oven, to heat the same to a temperature sufficient to cure and foam the material therewithin.

As mentioned previously, a useful phenomenon which occurs when the method of the instant invention is utilized, is the extrusion of small strands of the foamed material through the venting passageways, referred to as the formation of "spaghetti." The appearance of these strands evidences the completion of the foaming operation. In this manner, even an unskilled worker can determine when processing of the material within the molds is finished in order that he may remove the molds and cool the same, preferably in a water bath. This will prevent overheating and possible charring of the surface of the final product.

If desired, air may be inserted through at least one of the passageways to loosen the product from the mold walls, although this is not ordinarily necessary, following which the mold is opened and the finished product stripped therefrom.

It will be seen that the production of foamed articles utilizing the methods of the instant invention is particularly efficient and results in products of high quality and relatively low cost. Variation of the techniques may be readily accomplished to produce particular effects, although optimum operating condition from a commercial standpoint are genreally shown in FIGURE 15.

It will now be seen that there is herein provided improved methods for producing foamed articles and improved articles themselves all of which satisfy the objectives of the instant invention, and others, including many advantages of great practical utility and commercial importance.

What is claimed is:

1. A method of making, in a mold cavity, a foamed article from an unfoamed plastic composition, which composition is gellable, curable and foamable, said method comprising the steps of:
   (a) introducing an amount of said unfoamed plastic composition into said cavity, said amount being less by volume than the volume of said cavity, but sufficient that when said plastic composition is foamed, said cavity is filled to form a continuous foamed article within said cavity;
   (b) moving said cavity with said plastic composition therein to initially distribute said plastic composition throughout said cavity;
   (c) while moving said cavity, gelling said plastic composition on the walls of said cavity;
   (d) curing and foaming said gelled plastic composittion;
   (e) while foaming said plastic composition, communicating said cavity through relatively small passageway means with an environment under less pressure than that existent within said cavity; and
   (f) during at least step (d) maintaing said mold closed except for communication therewith through said passageway means;
   whereby said plastic composition is foamed to fill said cavity and form a continuous foamed article with the exterior surface of the resulting foamed article conforming with the surrounding surface of said cavity.

2. The method of claim 1 wherein at least a major portion of steps (d) and (e) are carried out by submerging the mold containing said cavity in a liquid heating medium heated to a temperature sufficient to cause curing and foaming of said plastic composition.

3. The method of claim 2 wherein said liquid heating medium has a boiling point higher than said temperature.

4. The method of claim 2 wherein said liquid heating medium is glycerine.

5. The method of claim 2 wherein steps (b), (c), (d) and (e) are all carried out in said liquid heating medium.

6. The method of claim 1 wherein steps (b), (c), (d) and (e) are carried out continuously in the presence of heat until said unfoamed plastic composition is cured and foamed.

7. The method of claim 1 wherein steps (b) and (c) are carried out by moving said cavity simultaneously orbitally about a first axis and rotationally about a second axis disposed at an angle to said first axis.

8. The method of claim 1 wherein steps (b), (c), (d) and (e) are carried out continuously by moving said cavity simultaneously orbitally about a first axis and rotationally about a second axis disposed at an angle to said first axis while heating said cavity until said plastic composition is cured and foamed.

9. The method of claim 1 wherein steps (d) and (e) are carried out by moving said cavity along a longitudinal path while rotating said cavity about an axis extending generally perpendicularly to said path.

10. The method of claim 1 and further including the step of positioning bendable members within said cavity in spaced relationship to at least some surfaces thereof prior to performing step (b) whereby said resultant foamed article has said bendable members embedded therein.

11. The method of claim 1 wherein said unfoamed plastic composition consists essentially of a foamable vinyl plastisol.

12. The method of claim 11 wherein said unfoamed plastic composition is subjected to mechanical mixing and aeration prior to step (a) to thereby improve the storage stability of said plastic composition and provide a more uniform foamed article.

13. The method of claim 1 wherein said cavity is heated in step (d) in a liquid heating medium and wherein step (e) is carried out at least in part by exposing spaced apart locations in said cavity to said liquid heating medium.

14. The method of claim 1 wherein said cavity is heated in step (d) in an oven and wherein step (e) is carried out at least in part by exposing spaced apart locations in said cavity to the surrounding atmosphere in said oven.

15. The method of claim 1 wherein step (d) is carried out in the presence of heat until strands of the foamed plastic composition are extrude through said passageway means and said cavity is then quenched to cool the foamed article therewithin.

16. The method of claim 1 wherein following complete foaming of said plastic composition, a pressurized fluid medium is passed into said cavity through at least one of said passageway means prior to otherwise opening said mold to facilitate separating the foamed article from said cavity.

17. The method of claim 1 wherein said cavity is heated in an oven and said cavity includes portions of relatively larger and smaller volumes, further comprising the step of at least partially heat shielding said portions of relatively smaller volume during steps (c) and (d) to at least substantially uniformly heat all sections of the foamed article.

18. A method of making, in a separable section mold having a cavity therein, a foamed article from an unfoamed plastic composition, which composition is gellable, curable and foamable when heated, said method comprising the steps of:
(a) introducing an amount of said unfoamed plastic composition into at least one section of said mold, said amount being less by volume than the volume of said cavity, but sufficient that when said plastic composition is foamed, said cavity is filled to form a continuous foamed article within said cavity;
(b) moving said mold with said plastic composition therein in various different directions to initially distribute said plastic composition throughout said cavity;
(c) while moving said cavity, heating the same sufficiently to gel said plastic composition on the walls of said cavity;
(d) further heating said cavity to cure and foam said plastic composition;
(e) while heating said cavity to foam said plastic composition, exposing through small spaced apart passageways, the interior of said cavity with a surrounding environment under less pressure than that existent within said cavity, whereby said plastic composition is foamed to fill said cavity and form a continuous foamed article with a smooth exterior surface conforming with the surrounding surface of said cavity;
(f) continuing said heating until strands of the foamed composition are extruded through said passageways;
(g) separating said mold sections; and
(h) stripping the foamed article from said mold.

19. The method of claim 18 wherein said mold is quenched in a cooling bath after step (f) and before step (g).

20. The method of claim 18 wherein said cavity has portions of relatively larger and smaller volumes, and wherein said passageways communicate with the larger volume portions.

21. The method of making, in a mold cavity, a foamed doll article at least having a torso and arms and legs from an unfoamed plastic composition, which composition is gellable, curable and foamable when heated, said method comprising the steps of:
(a) introducing an amount of said unfoamed plastic composition into said cavity, said amount being less by volume than the volume of said cavity, but sufficient that when said plastic composition is foamed, said cavity is filled to form a continuous foamed article within said cavity;
(b) moving said mold cavity with said plastic composition therein to initially distribute said plastic composition throughout said cavity;
(c) while moving said cavity, heating the same sufficiently to gel said plastic composition on the walls of said cavity;
(d) further heating said cavity to cure and foam said plastic composition;
(e) while heating said cavity to foam said plastic composition, communicating the portion of said cavity defining said torso through relatively small passageway means with an environment under less pressure than that existent within said cavity; and
(f) during at least step (d) maintaining said mold closed except for communication therewith through said passageway means;
whereby said plastic composition is cured and foamed to fill said cavity and form a continuous foamed article with the exterior surface of the doll article conforming with the surrounding surface of said cavity.

22. The method of claim 21 wherein said passageway means communicate the portions of said cavity defining the upper and lower portions of said torso respectively with the surrounding environment.

23. The method of claim 22 wherein said passageway means consist of spaced openings in said cavity at each of said portions of said cavity.

24. The method of claim 23 wherein step (b) is carried out by moving said cavity simultaneously orbitally about a first axis and rotationally about a second axis disposed at an angle to said first axis, and wherein step (c) is carried out in an oven.

25. The method of claim 24 wherein said cavity is moved during step (b) in opposite directions about at least one of said axes.

26. The method of claim 24 wherein steps (d) and (e) are carried out by moving said cavity along a longitudinal path while rotating said cavity about an axis extending generally perpendicularly to said path.

27. The method of claim 21 wherein said cavity also includes portions defining a head to form a complete and integral doll.

28. The method of claim 27 wherein said cavity further includes portions defining eye-receiving sockets in said head.

29. The method of claim 21 wherein said cavity includes relatively thin connecting portions between the portions of the same defining said torso and the portions of the same defining said arms and legs to form a "floppy" doll article.

30. The method of claim 29 wherein said relatively thin connecting portions each include a limited enlarged portion to facilitate passage of plastic composition and gases formed during foaming of the same between the portions of said cavity connected by said relatively thin connecting portions.

References Cited

UNITED STATES PATENTS

| | | | |
|---|---|---|---|
| 2,484,397 | 10/1949 | Barton | 264—54 XR |
| 2,569,869 | 10/1951 | Rempel | 264—310 XR |
| 2,624,072 | 1/1953 | Delacoste et al. | 264—310 |
| 2,684,503 | 7/1954 | Silver | 249—55 XR |
| 2,730,765 | 1/1956 | Crafton et al. | 264—310 XR |
| 2,737,503 | 3/1956 | Sprague et al. | 260—2.5 |
| 2,839,788 | 6/1958 | Dembiak | 264—310 XR |
| 2,853,400 | 9/1958 | Ahlbin | 264—54 XR |
| 2,893,057 | 7/1959 | Rekettye | 18—26 |
| 3,145,240 | 8/1964 | Proulx et al. | 264—335 XR |
| 3,161,712 | 12/1964 | Hungerford et al. | 264—310 |
| 1,644,027 | 10/1927 | O'Neill | 46—156 |
| 3,319,376 | 5/1967 | Doppelt et al. | 46—156 |

FOREIGN PATENTS

| | | |
|---|---|---|
| 413,955 | 7/1934 | Great Britain. |
| 218,027 | 10/1958 | Australia. |

OTHER REFERENCES

Rogers, T. H.: "Elastomeric Cellular Materials—II," in Rubber World, September 1955, pp. 753–757.

Cram, D. J.: "The Free Expansion of P.V.C. Using Azodicarbonamide," in British Plastics, January 1961, pp. 24–29.

Hansen, R. H.: "Novel Methods for the Production of Foamed Polymers: 1. Nucleation of Dissolved Gas By Localized Hot Spots," 20th Annual Tech. Conf., Technical Papers, vol. 10, Society of Plastics Engineers, Atlantic City, N.J., Jan. 27–Jan. 30, 1964, pp. 1–4.

PHILIP E. ANDERSON, *Primary Examiner.*

U.S. Cl. X.R.

264—54, 48, 310; 18—26, 5; 260—2.5; 264—50; 46—156